(12) United States Patent
Zhang et al.

(10) Patent No.: US 8,897,490 B2
(45) Date of Patent: Nov. 25, 2014

(54) VISION-BASED USER INTERFACE AND RELATED METHOD

(75) Inventors: ZhiWei Zhang, Hangzhou (CN); JianFeng Li, Hangzhou (CN); Li Mei, Hangzhou (CN); Jin Wang, Hangzhou (CN)

(73) Assignee: ArcSoft (Hangzhou) Multimedia Technology Co., Ltd., Hangzhou, Zhejiang Province (CN)

( * ) Notice: Subject to any disclaimer, the term of this patent is extended or adjusted under 35 U.S.C. 154(b) by 917 days.

(21) Appl. No.: 13/069,401

(22) Filed: Mar. 23, 2011

(65) Prior Publication Data

US 2012/0242566 A1   Sep. 27, 2012

(51) Int. Cl.
*G06K 9/00* (2006.01)
*G06F 3/01* (2006.01)

(52) U.S. Cl.
CPC ...................................... *G06F 3/017* (2013.01)
USPC ........... 382/103; 382/100; 382/181; 382/190; 382/195; 382/209; 345/156; 345/158

(58) Field of Classification Search
None
See application file for complete search history.

(56) References Cited

U.S. PATENT DOCUMENTS

| 6,788,809 | B1 * | 9/2004 | Grzeszczuk et al. | 382/154 |
|---|---|---|---|---|
| 2003/0156756 | A1 * | 8/2003 | Gokturk et al. | 382/190 |
| 2006/0008151 | A1 * | 1/2006 | Lin et al. | 382/190 |
| 2008/0019589 | A1 * | 1/2008 | Yoon et al. | 382/165 |
| 2011/0135148 | A1 * | 6/2011 | Hsiao et al. | 382/103 |
| 2011/0291926 | A1 * | 12/2011 | Gokturk et al. | 345/158 |
| 2012/0068917 | A1 * | 3/2012 | Huang et al. | 345/156 |

* cited by examiner

*Primary Examiner* — Matthew Bella
*Assistant Examiner* — Jason Heidemann
(74) *Attorney, Agent, or Firm* — Winston Hsu; Scott Margo

(57) ABSTRACT

A vision-based user interface includes an image input unit for capturing frame images, an image processor for recognizing a posture in at least one of the captured frame images, and generating a recognized gesture according to the posture, and a control unit for generating a control command corresponding to the recognized gesture.

10 Claims, 17 Drawing Sheets

VISION-BASED USER INTERFACE AND RELATED METHOD

BACKGROUND OF THE INVENTION

1. Field of the Invention

The present invention relates to user interfaces applied to electronic devices, and more particularly to a vision-based user interface and related method that take hand gestures as input.

2. Description of the Prior Art

Naturalness and ease of use are two main objectives in research of human-computer interaction (HCI). For a long time, in interacting with electronic devices such as television sets, computers, cameras, and mobile phones, people have had to use special input devices, such as keyboards, buttons, touch screens, and remote controllers. Although people have become used to these input devices, some inherent drawbacks exist. For example, with the increased popularity of handheld devices, and the decrease in size of such devices, keyboards and buttons are hard to integrate as input devices, or become so small that a user struggles to activate his/her intended button.

Direct use of the hand as an input device is an attractive method for providing natural human-computer interaction. Some existing techniques use electro-mechanical or magnetic sensing devices, such as data gloves, to acquire hand gestures. However, the use of such sensors increases both cost and inconvenience.

SUMMARY OF THE INVENTION

According to an embodiment, a vision-based user interface comprises an image input unit for capturing frame images, an image processor for recognizing a posture in at least one of the captured frame images, and generating a recognized gesture according to the posture, and a control unit for generating a control command corresponding to the recognized gesture.

According to an embodiment, a method of controlling a device according to a gesture performed by a user comprises capturing frame images by an image input unit, recognizing a posture in at least one of the captured frame images by an image processor, generating a recognized gesture according to the posture by the image processor, and generating a control command corresponding to the recognized gesture by a control unit.

These and other objectives of the present invention will no doubt become obvious to those of ordinary skill in the art after reading the following detailed description of the preferred embodiment that is illustrated in the various figures and drawings.

DETAILED DESCRIPTION

A vision-based hand gesture recognition system provides natural HCI, because only an additional embedded camera is needed, and the interaction becomes more natural and easier, without any other devices required. An interface system is provided which can detect hands and recognize different gestures with high precision and satisfying performance.

Figure 1:
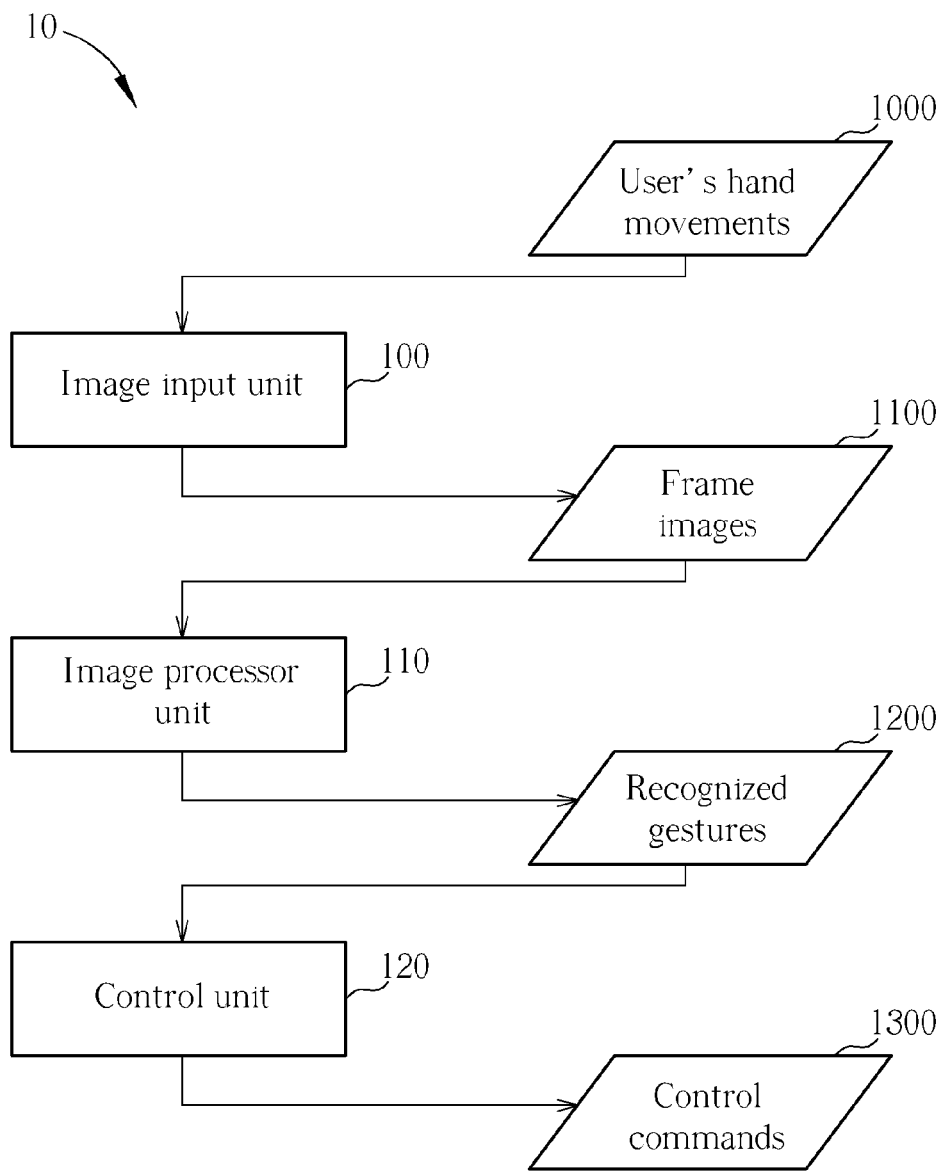
FIG. 1 is a diagram illustrating a system framework of a vision-based user interface according to an embodiment.

Please refer to FIG. 1, which is a diagram illustrating a system framework of a vision-based user interface 10 according to an embodiment. The vision-based user interface 10 comprises an image input unit 100, an image processor unit 110, and a control unit 120. The image input unit 100 comprises a video image sensor, and may further comprise an optical lens, and acts as an input unit for capturing video images 1100 of user hand movements 1000. The image processor unit 110 may be realized as an image processor and/or part of a general processor, and provides such functions as storing the input frame images 1100 and pre-trained gesture classifiers, detecting hand areas in the input images 1100, and recognizing various gestures. The control unit 120 may be a controller circuit, and/or part of the general processor, and acts as an output unit for translating recognition results (recognized gestures 1200) into control commands 1300 according to different applications, and outputting the control commands 1300.

With the vision-based user interface 10 equipped, the user can control an electronic device through hand gestures directly. The user need only make a predefined gesture before the video image sensor, and the captured frame images 1100 including the hands area are passed to the image processor 110. After a series of digital image processing and pattern recognition procedures, the predefined gesture is recognized by the image processor 110, and the result is transferred to the control unit 120, where the predefined gesture 1200 is translated into a relevant control command 1300 for operating the electronic device.

Compared with other gesture recognition systems, the vision-based user interface 10 shown in FIG. 1 has at least the following advantages:

1. The system has the ability to recognize more than 28 different hand gestures.
2. The system is robust to the following conditions: hand rotation, complex backgrounds, and varied illumination.
3. The system has high performance and is fully real-time.

Gestures Predefined

Figure 2:
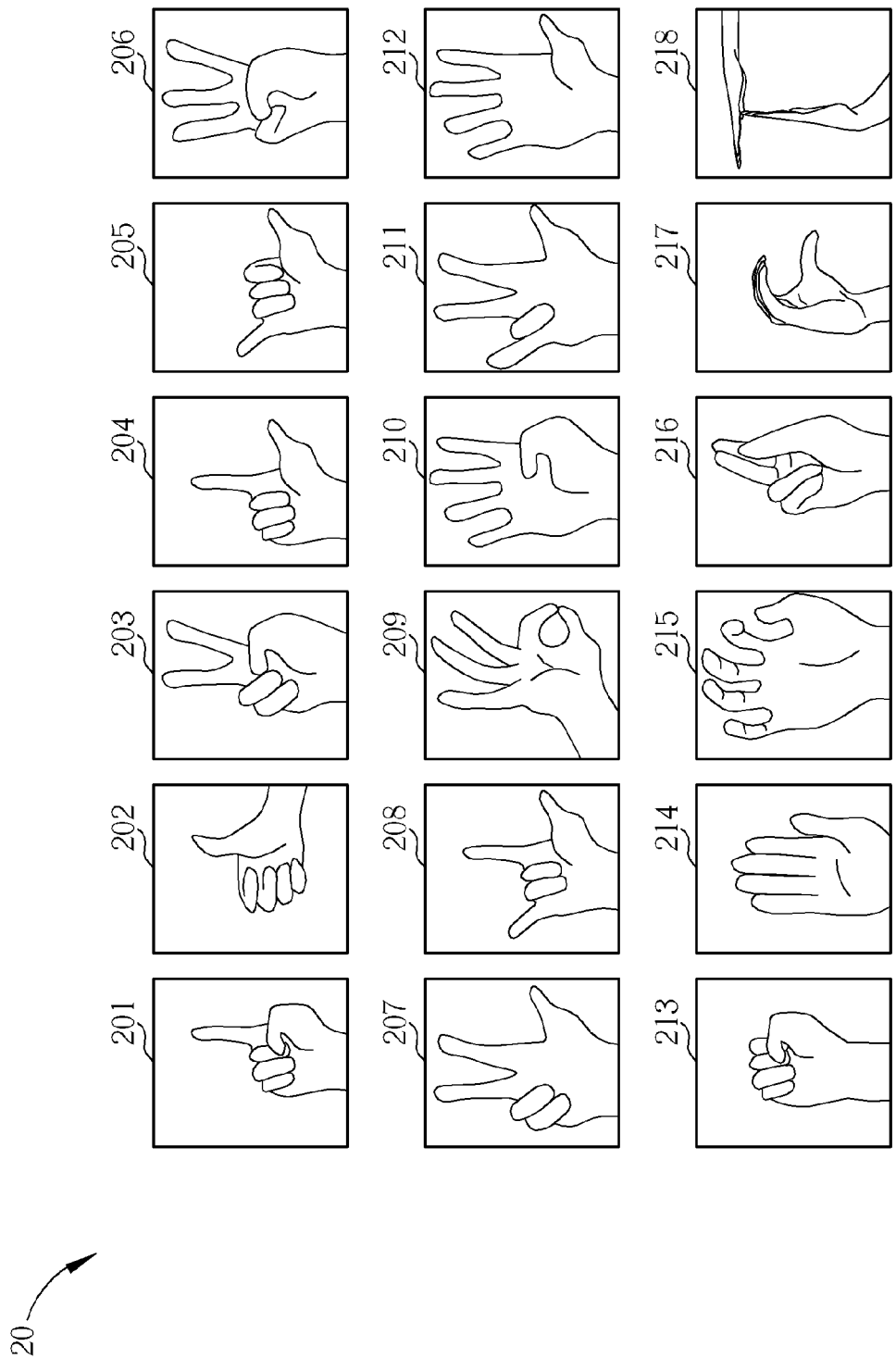
FIG. 2 is a diagram illustrating various predefined postures.
Figure 3:
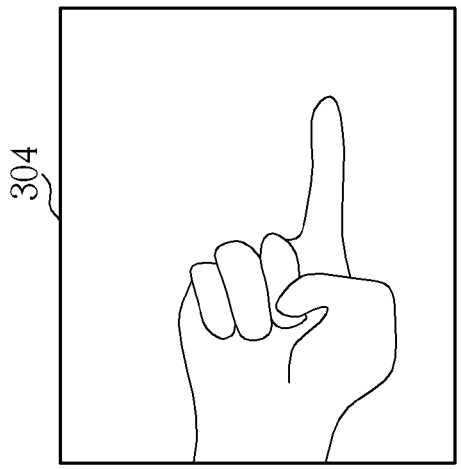
FIG. 3 illustrates examples of different posture orientations are for the posture 201 shown in FIG. 2.
Figure 3:
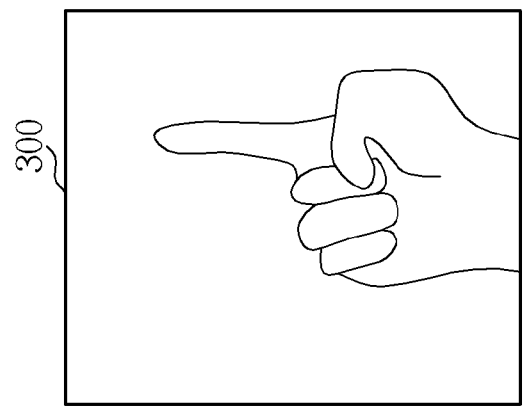
Figure 3:
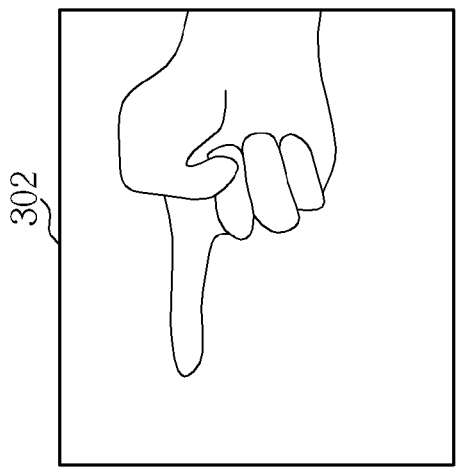

General speaking, "hand posture" refers to static hand shapes and finger configurations without movement, and "hand gesture" refers to intended hand movement, which comprises hand postures over a sequence of intervals. The vision-based user interface 10 can recognize at least 18 predefined hand postures. For convenience, hereafter if not specified, "postures" may be referred to as "gestures" as well. Please refer to FIG. 2, which is a diagram illustrating various predefined postures 201-218. The postures 201-218 are natural and easy. Please note that each posture may be assigned different meaning based on orientation in different directions. The vision-based user interface 10 has the ability to recognize postures having in-plane rotation. Examples of different posture orientations 300-302 are shown in FIG. 3 for the posture 201. As shown in FIG. 3, the posture 201 may be oriented in an "up" orientation 300, a "right" orientation 301, and a "left" orientation 302, each of which may be mapped to a different function for the same application or for different applications. The orientations and number thereof for each posture are not limited to the three shown in FIG. 3. A "down" posture may be recognized, and/or various other degrees of rotation, e.g. 45, 135, 225, and 315 degrees, without limitation thereto. Each posture orientation may further be assigned a range, e.g. ±5, 10, or 15 degrees, without limitation thereto.

Dynamic gestures may be of at least two types: movements of hands and transformations between postures. The vision-based user interface 10 supports both. With the ability to both detect static postures and track hand movements, the vision based user interface 10 can recognize at least ten different dynamic gestures.

Figure 4:
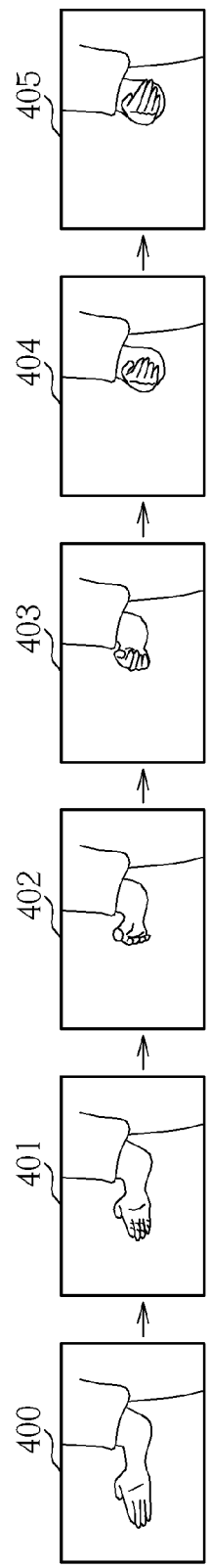
FIG. 4 illustrates a leftward motion.
Figure 5:
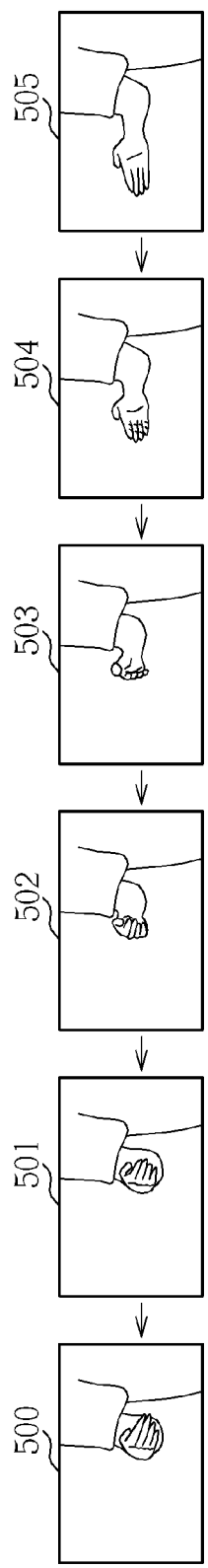
FIG. 5 illustrates a rightward motion.

Please refer to FIG. 4 and FIG. 5, which illustrate a leftward motion and a rightward motion, respectively. Frames 400-405 are examples of images captured by the vision-based user interface 10 when the user performs the leftward motion. Frames 500-505 are examples of images captured by the vision-based user interface 10 when the user performs the rightward motion. The two dynamic gestures may express opposite meanings, such as "previous/next" or "backward/forward". As shown in FIG. 4, the user's right hand may start at a relatively open position in frame 400, approximate a straight-on position in frame 402, and end at a relatively closed position in frame 405, with intermediate positions between as exemplified in frames 401, 403-404. As shown in FIG. 5, the user's right hand may start at a relatively closed position in frame 505, and end at an approximately straight-on position in frame 500, with intermediate positions between as exemplified in frames 501-504. Key positions, such as the starting and ending positions, and number of intermediate positions between the key positions, may be defined according to system requirements.

Figure 6:
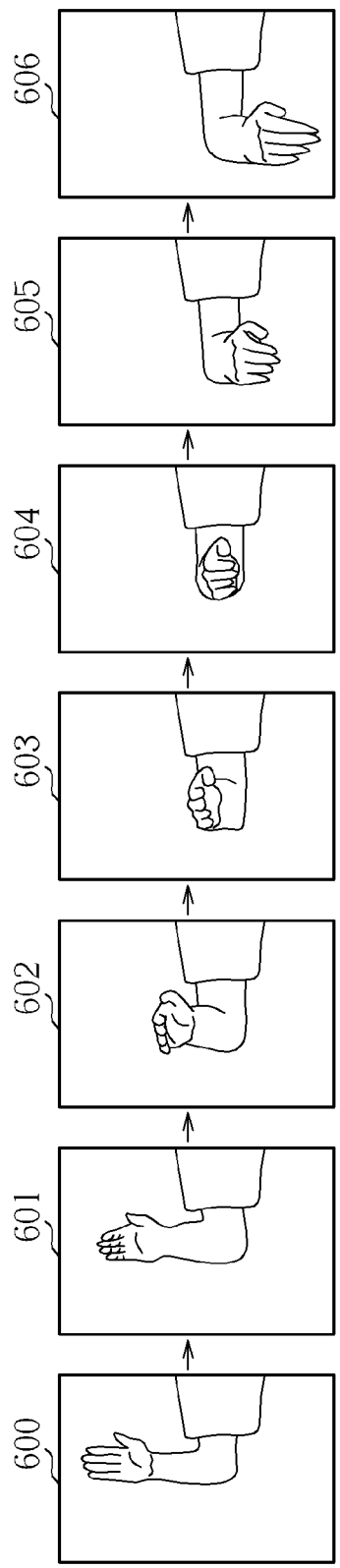
FIG. 6 illustrates a downward motion.
Figure 7:
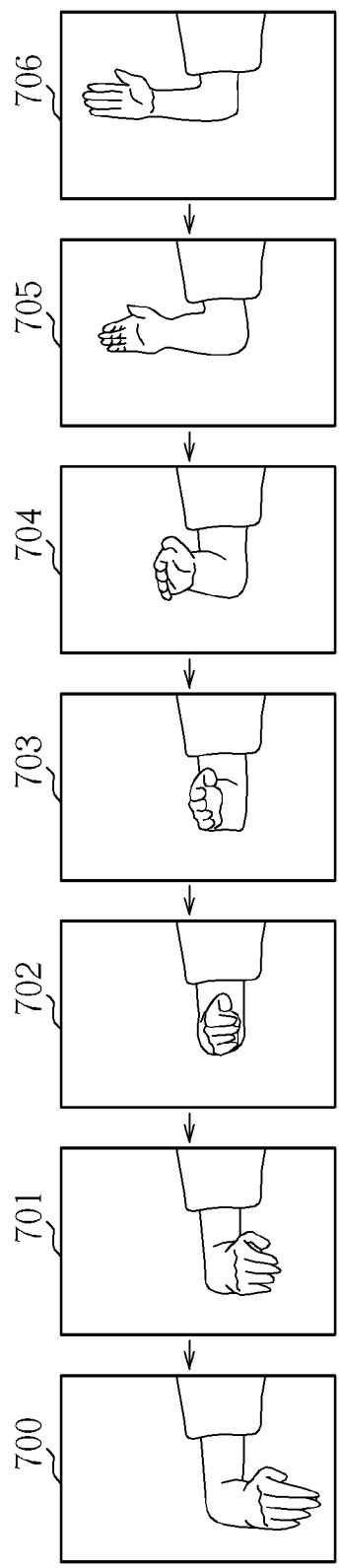
FIG. 7 illustrates an upward motion.

Please refer to FIG. 6 and FIG. 7, which illustrate a downward motion and an upward motion, respectively. Frames 600-606 in FIG. 6 are examples of images captured by the vision-based user interface 10 when the user performs the downward motion. Frames 700-706 are examples of images captured by the vision-based user interface 10 when the user performs the upward motion. The two motions may also express opposite meanings as described for the leftward and rightward motions above. As shown in FIG. 6, the downward motion may begin with the user's hand raised in frame 600, approximate a straight-on position in frame 604, and end with the user's hand lowered in frame 606, with intermediate positions between as exemplified in frames 601-603, 605. As shown in FIG. 7, the upward motion may begin with the user's hand lowered in frame 700, approximate a straight-on position in frame 703, and end with the user's hand raised in frame 706, with intermediate positions between as exemplified in frames 701-702, 704-705. Key positions, such as the starting and ending positions, and number of intermediate positions between the key positions, may be defined according to system requirements.

Figure 8:
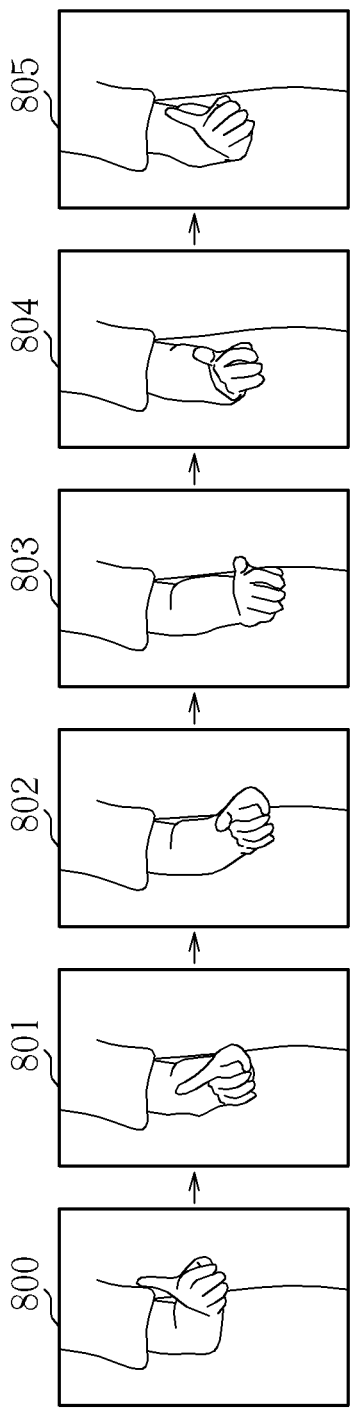
FIG. 8 illustrates a clockwise motion.
Figure 9:
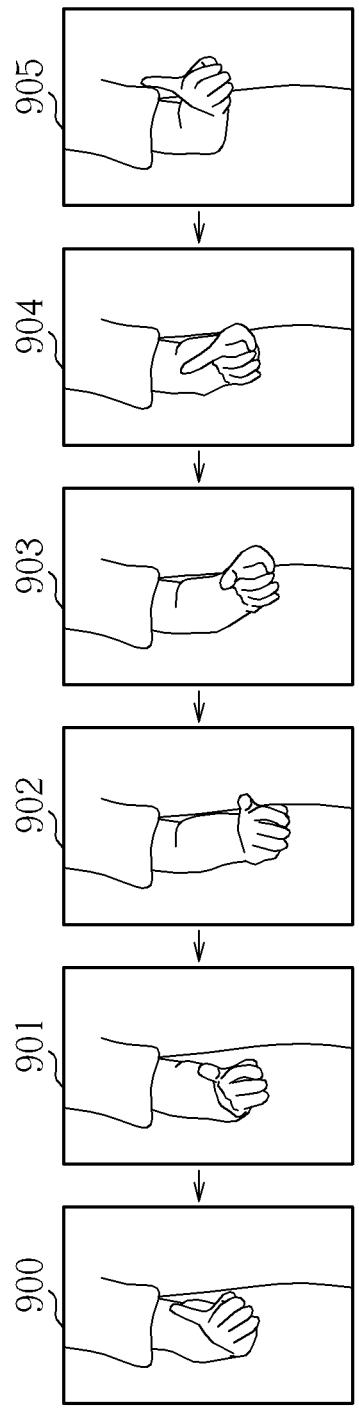
FIG. 9 illustrates a counter-clockwise motion.

Please refer to FIG. 8 and FIG. 9, which illustrate a clockwise motion and a counter-clockwise motion, respectively. Frames 800-805 in FIG. 8 are examples of images captured by the vision-based user interface 10 when the user performs the clockwise motion. Frames 900-905 are examples of images captured by the vision-based user interface 10 when the user performs the counter-clockwise motion. The two motions may also express opposite meanings as described for the leftward and rightward motions, and the upward and downward motions, above. As shown in FIG. 8, the clockwise motion may begin with the user's finger pointing up in frame 800, with each successive frame 801-805 tracing a clockwise are based on relative position of the user's finger. As shown in FIG. 9, the counter-clockwise motion may begin with the user's hand at a first location in frame 905, with each successive frame 904, 903, . . . 900 tracing a counter-clockwise are based on relative position of the user's finger. The entire finger may be tracked, the entire hand may be tracked, or a fingertip of the finger may be tracked, without limitation thereto.

Figure 10:
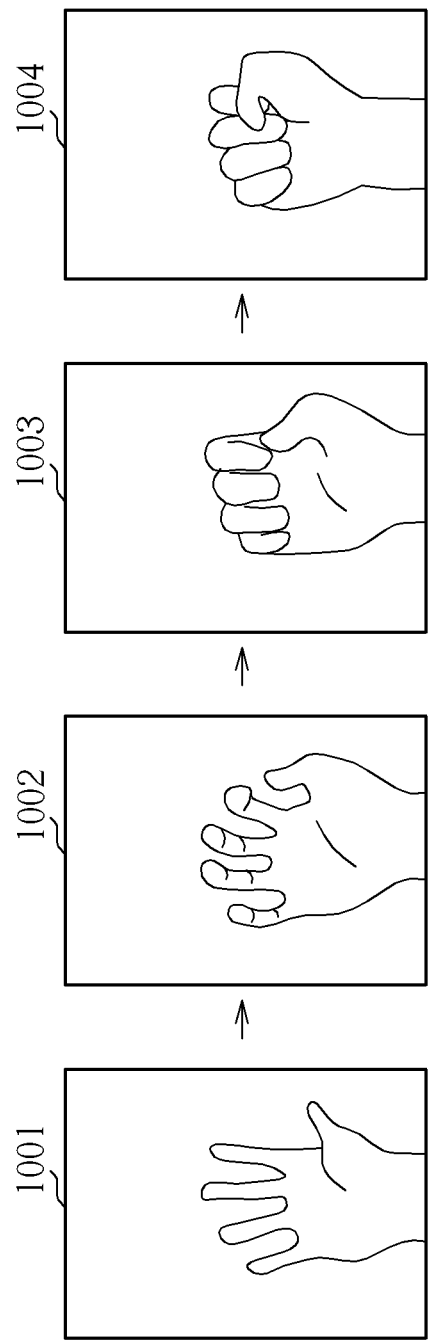
FIG. 10 illustrates a grasping motion.
Figure 11:
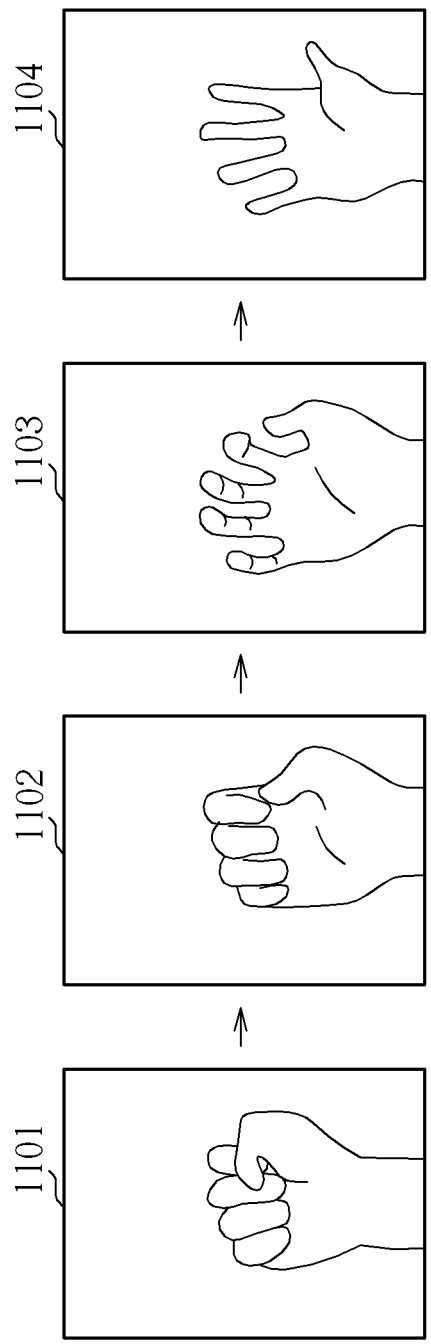
FIG. 11 illustrates a loosing motion.

Please refer to FIG. 10 and FIG. 11, which illustrate a grasping motion and a loosing motion, respectively. The grasping motion and the loosing motion may be produced as transformations between predefined static postures. For example, in FIG. 10, a loose posture may be captured in frame 1001, and a grasp posture may be captured in frame 1004, with intermediate frames 1002-1003 captured therebetween. In FIG. 11, the grasp posture may be captured in frame 1101, and the loose posture may be captured in frame 1104, with intermediate frames 1102-1103 captured therebetween.

Figure 12:
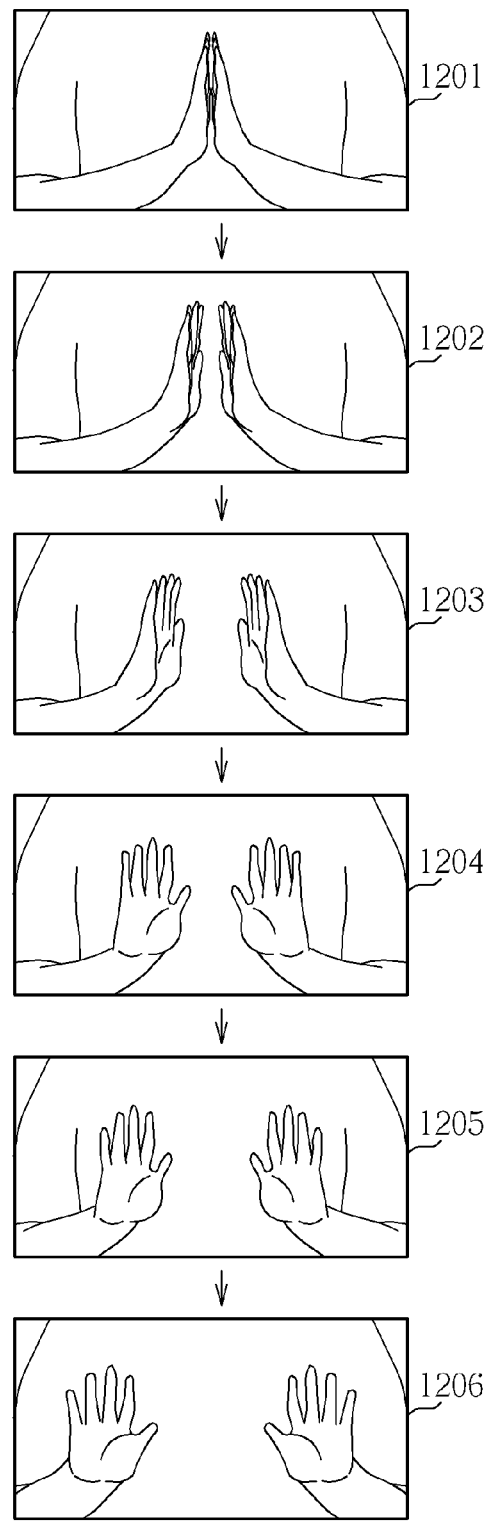
FIG. 12 illustrates an opening gesture.
Figure 13:
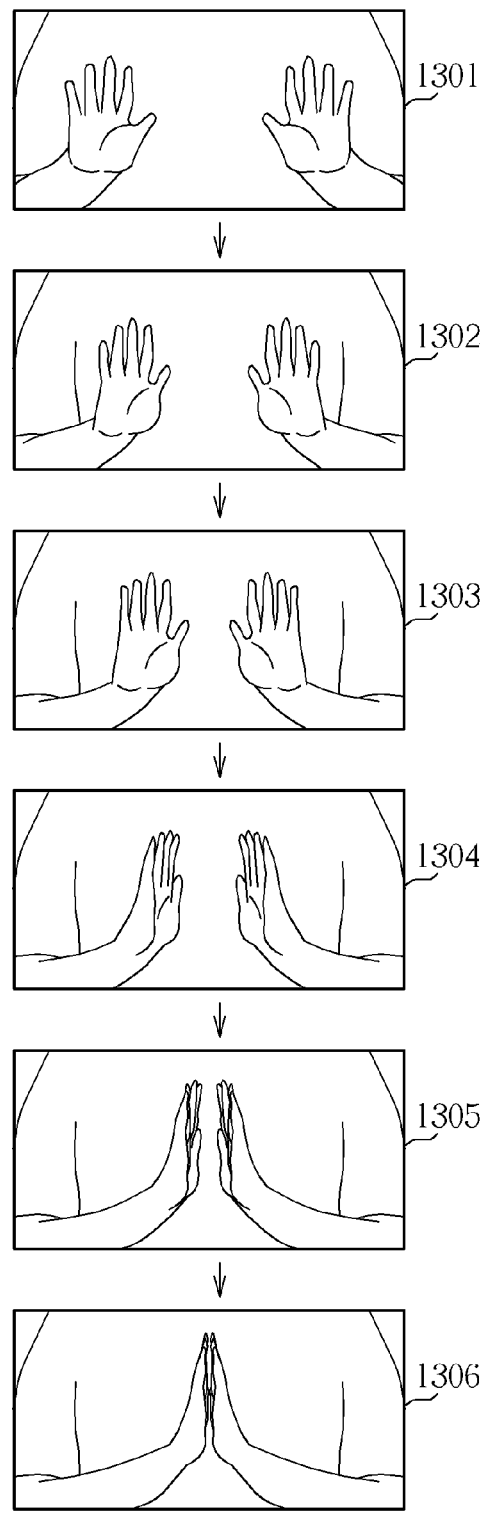
FIG. 13 illustrates a closing gesture.

Please refer to FIG. 12 and FIG. 13, which illustrate an opening gesture and a closing gesture. The opening and closing gestures may be two-handed gestures, and may be used to express meanings such as zoom in and zoom out. As shown in FIG. 12, the user's hands may begin in a straight-on position and close together (frame 1201), and may end in open position and far apart (frame 1206), with intermediate frames 1202-1205 therebetween. As shown in FIG. 13, the user's hands may begin in the open position and far apart (frame 1201), and may end in the straight-on position and close together (frame 1206), with intermediate frames 1202-1205 therebetween.

In addition to the gestures described above and illustrated in FIG. 4 to FIG. 13, the vision-based user interface 10 is easily extended to recognize many user-defined gestures. A user may define a new gesture comprising two or more successive postures, and set a corresponding control command. So, in fact, the vision-based user interface 10 may recognize many more than the 28 predefined gestures mentioned above.

Image Processor Unit

Figure 14:
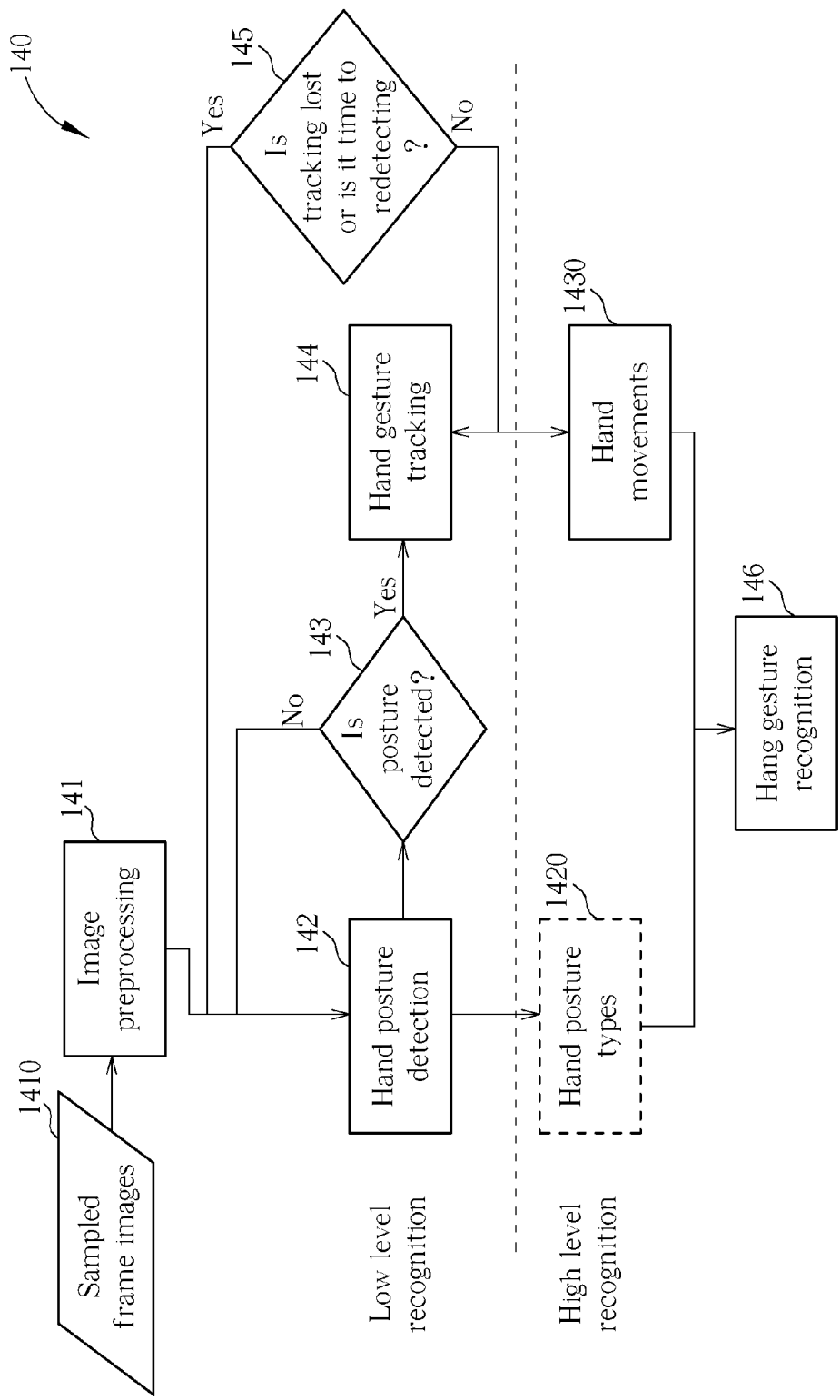
FIG. 14 is a diagram illustrating a gesture recognition workflow used in the image processor shown in FIG. 1 according to one embodiment.
Figure 15:
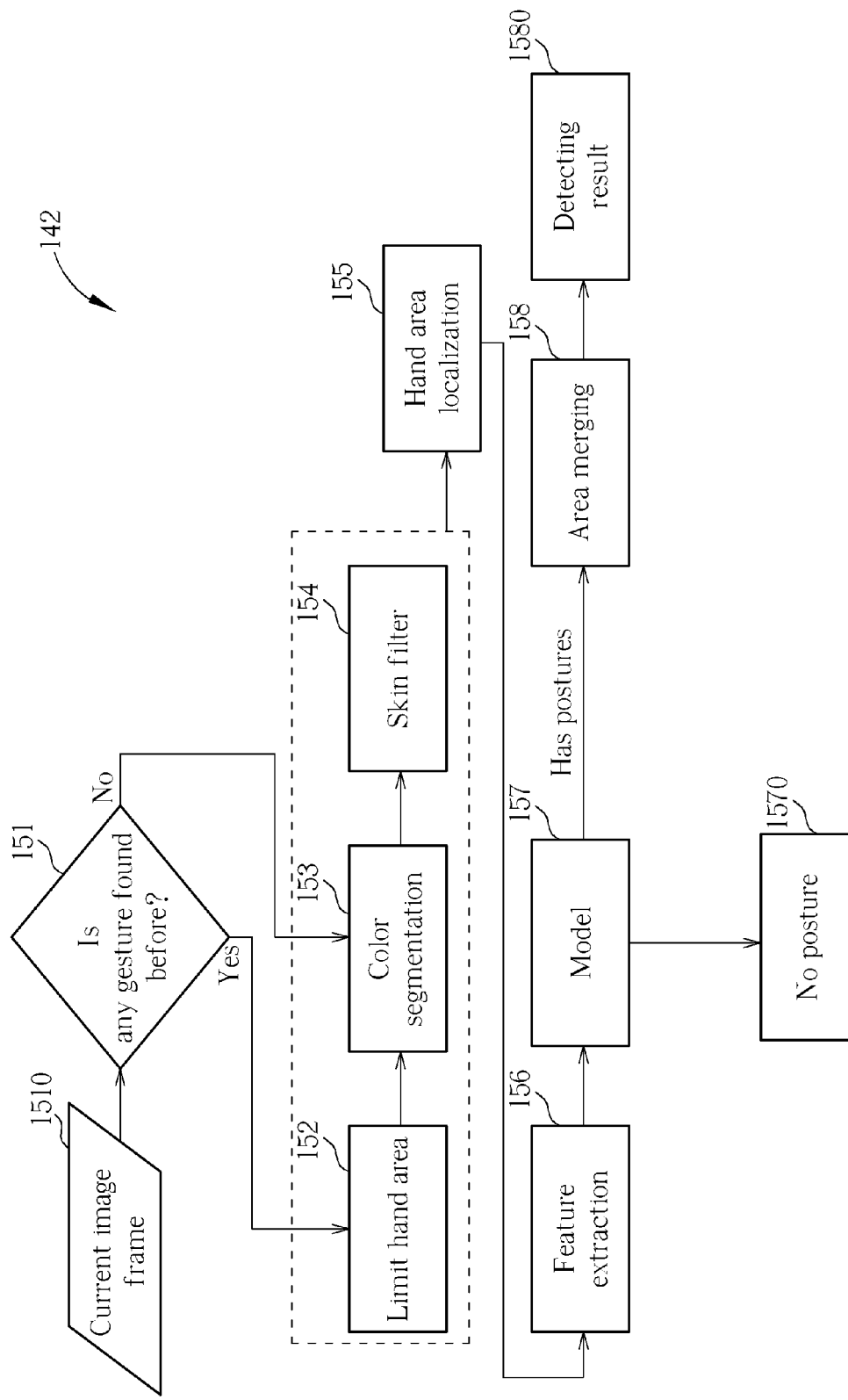
FIG. 15 is a diagram illustrating a process for performing hand posture detection.

Please refer to FIG. 14 and FIG. 15. FIG. 14 is a diagram illustrating a gesture recognition workflow 140 used in the image processor 110 shown in FIG. 1 according to one embodiment. FIG. 15 is a diagram illustrating a process 142 for performing hand posture detection. Real-time user hand movements are captured and sampled by a digital video image sensor. Then, the sampled frame images 1410 are passed to the image processor 110 as input.

Image Preprocessing

The image processor 110 may initially perform preprocessing steps, such as image resizing, automatic exposure correction, and histogram equalization operations, on the sampled frame images 1410 (Step 141). Step 141 may be performed by an image preprocessing unit of the image processor 110.

Hand Posture Detection

Two different levels of hand recognition are included in the vision-based user interface 10: static posture detection as low level recognition, and dynamic gesture recognition as high level recognition (as indicated by the dashed line in FIG. 14). It should be noted that the postures to be detected include staggered static postures that form the dynamic gestures.

Referring to FIG. 15, hand area localization (Step 155) is the first step of hand posture detection (Step 142). When a hand is found in a preceding frame, the area to be searched is limited to a small range in a current frame 1510 (Step 152). Color information also aids in localizing the hand area. A mean shift algorithm is utilized for performing color segmentation (Step 153). With some priori knowledge of the hand area, such as color and shape, a skin filter is built to remove color blocks in which the hand cannot possibly exist (Step 154). Step 155 may be performed by a hand area localization unit. Step 142 may be performed by a hand posture detection unit.

Feature extraction is the second step of detection (Step 156). After hand localization, candidate color blocks are obtained. The candidate color blocks are fitted into rectangular windows. Posture detection is processed in these windows. Variant features such as gradient, texture and outlines are extracted from every window. Step 156 may be performed by a feature extraction unit electrically connected to the hand area localization unit.

Model matching is the third step (Step 157). All features are transferred into parallel classifiers. Each parallel classifier has a pre-built model corresponding to certain predefined postures. Matching between input feature patterns and all models is very complex, and incurs high computing cost. However, in a system application environment, and using logical processes, only a few posture types need be considered. According to a matching calculation result, the current window is determined to be a posture-containing window containing one of the postures, or is determined to be a "none window" having no posture therein (1570). Step 157 may be performed by a model matching unit electrically connected to the feature extraction unit.

Area merging and updating is the final step of detection (Step 158). When multiple neighboring hand areas (posture-containing windows) are found, the hand areas should be merged and updated. A merging method based on kernel density estimation is used to find the most likely position and size for the neighboring candidate hand areas. A detecting result 1580 may be either the merged block for multiple candidate hand areas, or a single hand area for a single candidate hand area. Step 158 may be performed by an area merging unit electrically connected to the model matching unit.

Hand Tracking

Figure 16:
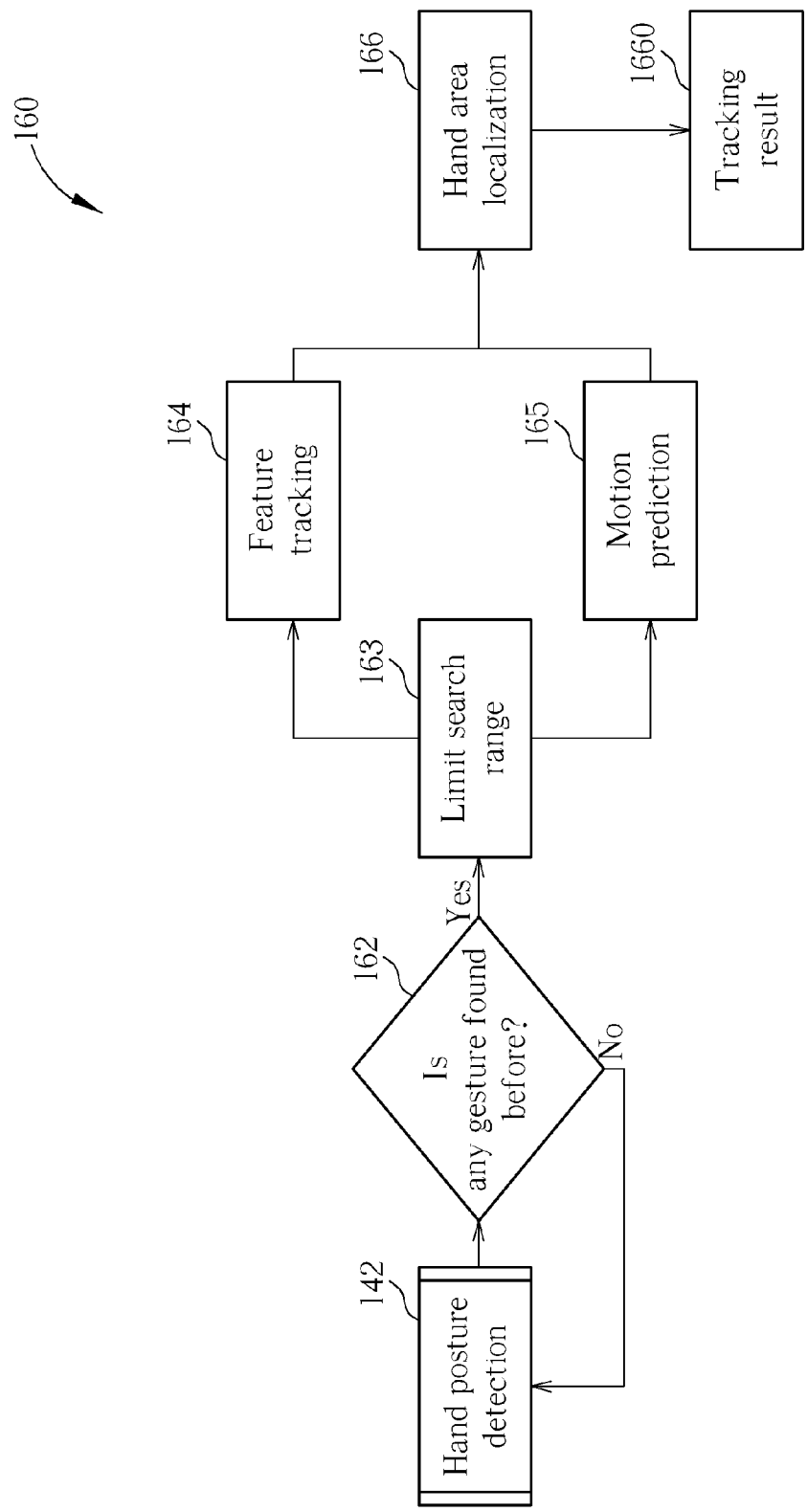
FIG. 16 is a diagram illustrating a process for performing hand tracking.

Please refer to FIG. 16, which is a diagram illustrating a process 160 for performing hand tracking. The process 160 corresponds to Steps 142, 143, 144 shown in FIG. 14. Step 144 may be performed by a hand gesture tracking unit, which outputs hand movements for hand gesture recognition. When a posture is detected in Step 161, hand tracking (Step 144) begins in successive frames. Hand tracking begins in a limited range according to the detected hand area. The range is limited in Step 163. The tracking method combines feature tracking (Step 164) and motion prediction (Step 165) using information fusion (Step 166). Feature tracking (Step 164) searches possible positions in the current frame using features extracted from pre-gestures. In motion prediction (Step 165), motion of the gesture is assumed to be linear, and the position can be predicted based on previous velocity of the hand(s) over the sampled frame images 1410. Information fusion technology combines the results of feature tracking and motion prediction (Step 166) to form a tracking result 1660. Step 163 may be performed by a search range limiting unit, Step 164 may be performed by a feature tracking unit electrically connected to the search range limiting unit, Step 165 may be performed by a motion prediction unit electrically connected to the search range limiting unit, and Step 166 may be performed by an information fusion unit electrically connected to the feature tracking unit and the motion prediction unit.

Hand position and movement information are recorded during tracking. If the vision-based user interface 10 fails to track the hand, the system returns to the posture detection procedure 161. Reasons for tracking failure include, but are not limited to, the hand disappearing in the image and the hand's shape changing too much between successive frames. In order to capture a rapidly changing hand, posture detection 161 may be enforced every certain number of frames.

Hand Gesture Recognition

Referring to FIG. 14 again, the gesture recognition procedure (Step 146) is a high level recognition procedure. Hand posture types 1420, transformation status between various posture types, hand movements 1430, and even application environment are used in the gesture recognition procedure (Step 146). When a posture is detected, the dynamic gesture recognition procedure (Step 146) is triggered. During this procedure, detected postures are saved in turn in a list table, e.g. in an electronic memory device. When current posture is detected and pushed into the table, the hand gesture recognition procedure synthetically analyzes the information of all detected postures in the table, and respective movement contexts thereof (such as posture interval times), and determine whether a predefined dynamic gesture has been matched. Meanwhile, the table containing the postures is updated. Step 146 may be performed by a gesture recognition unit electrically connected to the hand posture detection unit and the hand gesture tracking unit.

Control Unit

Figure 17:
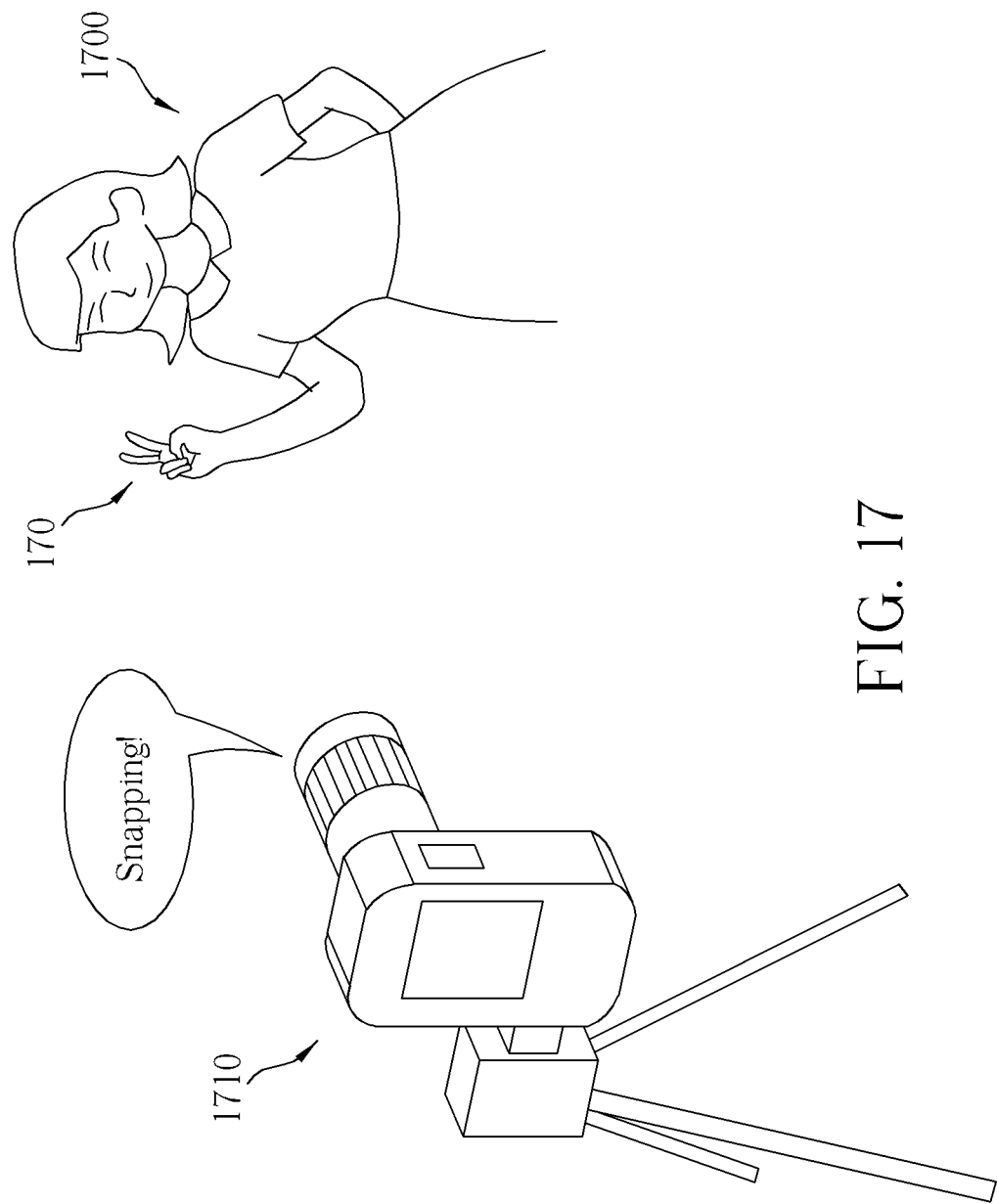
FIG. 17 illustrates utilization of the vision-based user interface in a camera.

The control unit 120 is a translator in the vision-based user interface 10. In different environments, each gesture may have different meanings. For example, in an image browsing application, a right-to-left wave gesture, such as the rightward motion shown in FIG. 5, may correspond to browsing to the next image, whereas in a video player application, the identical gesture may correspond to fast forward. The control unit 120 translates predefined gestures into special commands according to current functions or applications of the electronic device. Another such function is shown in FIG. 17, which illustrates utilization of the vision-based user interface 10 in a camera 1710. When a user 1700 makes a posture 170, such as the posture 203 shown in FIG. 2, the image input unit 100 captures the posture 170 in a frame image 1100, the image processor 110 recognizes the posture 170 to output a recognized gesture 1200 corresponding to the posture, and the control unit 120 issues a control command 1300 corresponding to the recognized gesture 1200 to control the camera 1710 to take a photograph. The photograph may be taken using the same lens and sensor utilized by the image input unit 100 for capturing the posture 170.

Compared with other gesture recognition systems, the vision-based user interface 10 has the advantages of ability to recognize many different hand gestures, robustness to hand rotation, complex backgrounds, and varied illumination, and high performance that is fully real-time.

Those skilled in the art will readily observe that numerous modifications and alterations of the device and method may be made while retaining the teachings of the invention.

What is claimed is:

1. A vision-based user interface comprising:
an image input unit for capturing frame images;

an image processor for recognizing a posture in at least one of the captured frame images, and generating a recognized gesture according to the posture; the image processor comprising:
- a hand area localization unit for limiting range for recognizing the posture to a limited range of the at least one captured frame images;
- a feature extraction unit for obtaining candidate color blocks within the limited range, fitting the candidate color blocks into rectangular windows, and extracting variant features from each rectangular window; and
- a model matching unit for transferring the variant features into parallel classifiers to generate a matching calculation result, and determining each rectangular window to be a posture-containing window or a none window, wherein each parallel classifier has a pre-built model corresponding to at least one predefined posture; and a control unit for generating a control command corresponding to the recognized gesture.

2. The vision-based user interface of claim 1, wherein the image processor further comprises:
- an area merging unit for merging two or more posture-containing windows into a merged block according to distribution of the two or more posture-containing windows.

3. The vision-based user interface of claim 2, wherein the image processor further comprises:
- a feature tracking unit for searching possible positions in the current frame image according to features extracted from pre-gestures to generate a position; and
- a motion prediction unit for predicting the position according to previous velocity of a hand over the at least one captured frame images.

4. The vision-based user interface of claim 3, wherein the image processor further comprises:
- an information fusion unit for combining outputs of the feature tracking unit and the motion prediction unit.

5. The vision-based user interface of claim 4, wherein the image processor further comprises:
- a gesture recognition unit electrically connected to the hand posture detection unit and the hand gesture tracking unit for outputting the recognized gesture according to a hand posture type outputted by the hand posture detection unit and a hand movement outputted by the hand gesture tracking unit.

6. A method of controlling a device according to a gesture, the gesture performed by a user, the method comprising:
- capturing frame images by an image input unit;
- limiting range for recognizing the posture to a limited range of the at least one captured frame images;
- obtaining candidate color blocks within the limited range;
- fitting the candidate color blocks into rectangular windows;
- extracting variant features from each rectangular window;
- transferring the variant features into parallel classifiers to generate a matching calculation result, wherein each parallel classifier has a pre-built model corresponding to at least one predefined posture;
- determining each rectangular window to be a posture-containing window or a none window;
- recognizing a posture in at least one of the captured frame images by an image processor;
- generating a recognized gesture according to the posture by the image processor; and
- generating a control command corresponding to the recognized gesture by a control unit.

7. The method of claim 6, further comprising:
- merging two or more posture-containing windows into a merged block according to distribution of the two or more posture-containing windows.

8. The method of claim 7, further comprising:
- (a) searching possible positions in the current frame image according to features extracted from pre-gestures to generate a position; and
- (b) predicting the position according to previous velocity of a hand over the at least one captured frame images.

9. The method of claim 8, further comprising:
- combining results of steps (a) and (b) to generate a tracking result.

10. The method of claim 9, further comprising:
- outputting the recognized gesture according to a hand posture type and a hand movement.

* * * * *